(12) United States Patent
Cosentino et al.

(10) Patent No.: US 9,530,019 B1
(45) Date of Patent: Dec. 27, 2016

(54) ENCAPSULATED SIMULATION COMPONENTS

(71) Applicant: SAS IP, Inc., Cheyenne, WY (US)

(72) Inventors: James Cosentino, Pittsburgh, PA (US);
Magdalena Zhan, Pittsburgh, PA (US);
Abhijeet Magdum, San Jose, CA (US);
Matthew Commens, Sewickley, PA (US)

(73) Assignee: SAS IP, Inc., Cheyenne, WY (US)

(*) Notice: Subject to any disclaimer, the term of this patent is extended or adjusted under 35 U.S.C. 154(b) by 0 days.

(21) Appl. No.: 14/797,551

(22) Filed: Jul. 13, 2015

Related U.S. Application Data

(60) Provisional application No. 62/024,130, filed on Jul. 14, 2014.

(51) Int. Cl.
*G06F 21/62* (2013.01)
*G06F 17/50* (2006.01)
*G06F 21/10* (2013.01)

(52) U.S. Cl.
CPC ....... *G06F 21/6209* (2013.01); *G06F 17/5009* (2013.01); *G06F 21/10* (2013.01); *G06F 21/6272* (2013.01); *G06F 2221/0724* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 5,980,096 A | * | 11/1999 | Thalhammer-Reyero | G05B 17/02 |
| 6,467,085 B2 | * | 10/2002 | Larsson | G06F 9/4428 709/223 |
| 6,505,149 B1 | * | 1/2003 | Griswold | G06F 17/5022 703/13 |
| 6,745,160 B1 | * | 6/2004 | Gupta | G06F 17/504 703/13 |

(Continued)

OTHER PUBLICATIONS

Conner et al.; Three-dimensional widgets; Published in: Proceeding I3D '92 Proceedings of the 1992 symposium on Interactive 3D graphics; 1992; pp. 183-188; ACM Digital Library.*

(Continued)

*Primary Examiner* — Bradley Holder
(74) *Attorney, Agent, or Firm* — Jones Day

(57) ABSTRACT

Systems and methods are provided for providing protected three-dimensional components for simulation. A three-dimensional component may be accessed, wherein the three-dimensional component includes one or more characteristics of the three-dimensional component, and wherein certain values of the characteristics of the three-dimensional components are variable via a parameter. An encapsulation command may be received for the three-dimensional component, wherein the encapsulation command includes an encryption setting, an access control setting, and an identification of which values of the characteristics of the three-dimensional component are variable via a parameter. An encapsulation of the three-dimensional component may be generated, wherein the encapsulation is encrypted based on (Continued)

the encryption setting and the access control setting, and wherein, when the three-dimensional component is encrypted, the three-dimensional component is inaccessible outside of an authorized program.

40 Claims, 5 Drawing Sheets

(56) References Cited

U.S. PATENT DOCUMENTS

| | | | | |
|---|---|---|---|---|
| 6,983,227 B1* | 1/2006 | Thalhammer-Reyero | | G05B 17/02 345/419 |
| 7,383,166 B2* | 6/2008 | Ashar | ................... | G06F 17/504 703/13 |
| 7,401,333 B2* | 7/2008 | Vandeweerd | ......... | G06F 9/5066 712/16 |
| 7,409,328 B1* | 8/2008 | McGaughy | ......... | G06F 17/5036 703/14 |
| 2001/0049595 A1* | 12/2001 | Plumer | ................... | G06Q 10/00 703/22 |
| 2002/0029378 A1* | 3/2002 | Larsson | ................... | G06F 8/24 717/159 |
| 2002/0065645 A1* | 5/2002 | Wall | ......................... | G06F 8/10 703/22 |
| 2002/0090595 A1* | 7/2002 | Hubbell | ................... | G09B 5/06 434/118 |
| 2004/0006584 A1* | 1/2004 | Vandeweerd | ......... | G06F 9/5066 718/107 |
| 2004/0148150 A1* | 7/2004 | Ashar | ................... | G06F 17/504 703/14 |
| 2005/0095572 A1* | 5/2005 | Comer | .................... | G09B 7/02 434/362 |

OTHER PUBLICATIONS

Repenning et al.; Using components for rapid distributed software development; Published in: IEEE Software (vol. 18 , Issue: 2 ); pp. 38-45; Date of Publication: Mar./Apr. 2001; IEEE Xplore.*

* cited by examiner

COMPONENT_TABLE

| COMPONENT_ID | COMPONENT_NAME | COMPONENT_CREATOR | COMPONENT_SIZE | COMPONENT_ACCESS_TERMS |
|---|---|---|---|---|
| 1 | SOLENOID | DAVE C | 1024 | PROPERTY OF XYZ CORP., ACCESSIBLE ONLY UNDER LICENSED TERMS |
| 2 | ANTENNA | SHANNON S | 4096 | PROPERTY OF XYZ CORP., INTERNAL ACCESS ONLY |

PARAMETER_TABLE

| PARAMETER_ID | PARAMETER_COMPONENT | PARAMETER_NAME | PARAMETER_TYPE | PARAMETER_VALUE | PARAMETER_ADJUSTABLE |
|---|---|---|---|---|---|
| 1 | 1 | MATERIAL | 1 | 4 | 0 |
| 2 | 1 | LOOPS | 3 | 12 | 1 |
| 3 | 2 | INTERNAL MATERIAL | 1 | 7 | 0 |
| 4 | 2 | EXTERNAL MATERIAL | 2 | 4 | 0 |
| 5 | 2 | HEIGHT | 3 | 2.1 | 1 |
| 6 | 2 | THICKNESS | 4 | 0.75 | 1 |

ENCAPSULATED SIMULATION COMPONENTS

CROSS-REFERENCE TO RELATED APPLICATIONS

This application claims priority to U.S. Provisional Patent Application No. 62/024,130, filed Jul. 14, 2014, entitled "Encapsulated Simulation Components," the entirety of which is herein incorporated by reference.

FIELD

The technology described in this patent document relates generally to computer simulation systems.

BACKGROUND

Systems exist for simulating physical field quantities, such as electric and magnetic fields, flow velocity and pressure fields, temperature fields, etc., that govern the behavior of physical structures or devices. One such system is the industry leading ANSYS® HFSS™ three-dimensional (3D) electromagnetic (EM) simulation tool sold by ANSYS, Inc. of Canonsburg, Pa.

Engineers typically design individual components and then assemble these components into systems. Physical field quantities, however, act on the entire modeled region, across component boundaries. Systems are often analyzed in a modular manner—making simplifying assumptions about how a component can be excited or may excite adjacent components, then simulating the fields in each individual component, and then simulating the interactions between components. But this type of analysis does not capture all of the possible physical interactions in the system, and may therefore be limited in accuracy. Another known approach is to assemble component geometries, and apply a simulation setup to each component in the system. This method may yield more accurate results, but does not scale well with larger systems. There is therefore a need for a simulation method that bridges the gap between these two approaches—offering the ease-of-use and modularity of a simulation-ready component assembly with the accuracy of a complete 3D simulation.

SUMMARY

In accordance with the teaching described herein, systems and methods are provided for providing protected three-dimensional components for simulation. A three-dimensional component may be accessed, wherein the three-dimensional component includes one or more characteristics of the three-dimensional component, and wherein certain characteristic values of the three-dimensional components are variable via a parameter. An encapsulation command may be received for the three-dimensional component, wherein the encapsulation command includes an encryption setting, an access control setting, an identification of which characteristic values of the three-dimensional component are variable via a parameter, and an identification of which of the characteristic values are not variable. An encapsulation of the three-dimensional component may be generated, wherein the encapsulation is encrypted based on the encryption setting and the access control setting, and wherein, when the three-dimensional component is encrypted, the three-dimensional component is inaccessible outside of an authorized program. The encapsulation may be transmitted to a third party, wherein when the encapsulation is accessed via the authorized program according to the access control setting, the three-dimensional component is usable for simulation, and wherein the variable characteristic values are available for adjustment by the third party for simulation via a parameter.

BRIEF DESCRIPTION OF THE DRAWINGS

FIGS. 4A and 4B are an example of a data structure for an encapsulated three-dimensional component.

DETAILED DESCRIPTION

As systems subject to simulation become larger and more complex, it may be desirable to encapsulate and reuse component data in order to make the process of simulation setup efficient and manageable. Encapsulation enables one engineer to create a simulation-ready component for use by a different engineer. In this manner, the component creator may, for example, be able to control how the component will be simulated, and, through encryption and password protection, who is able to use the component.

Figure 1:
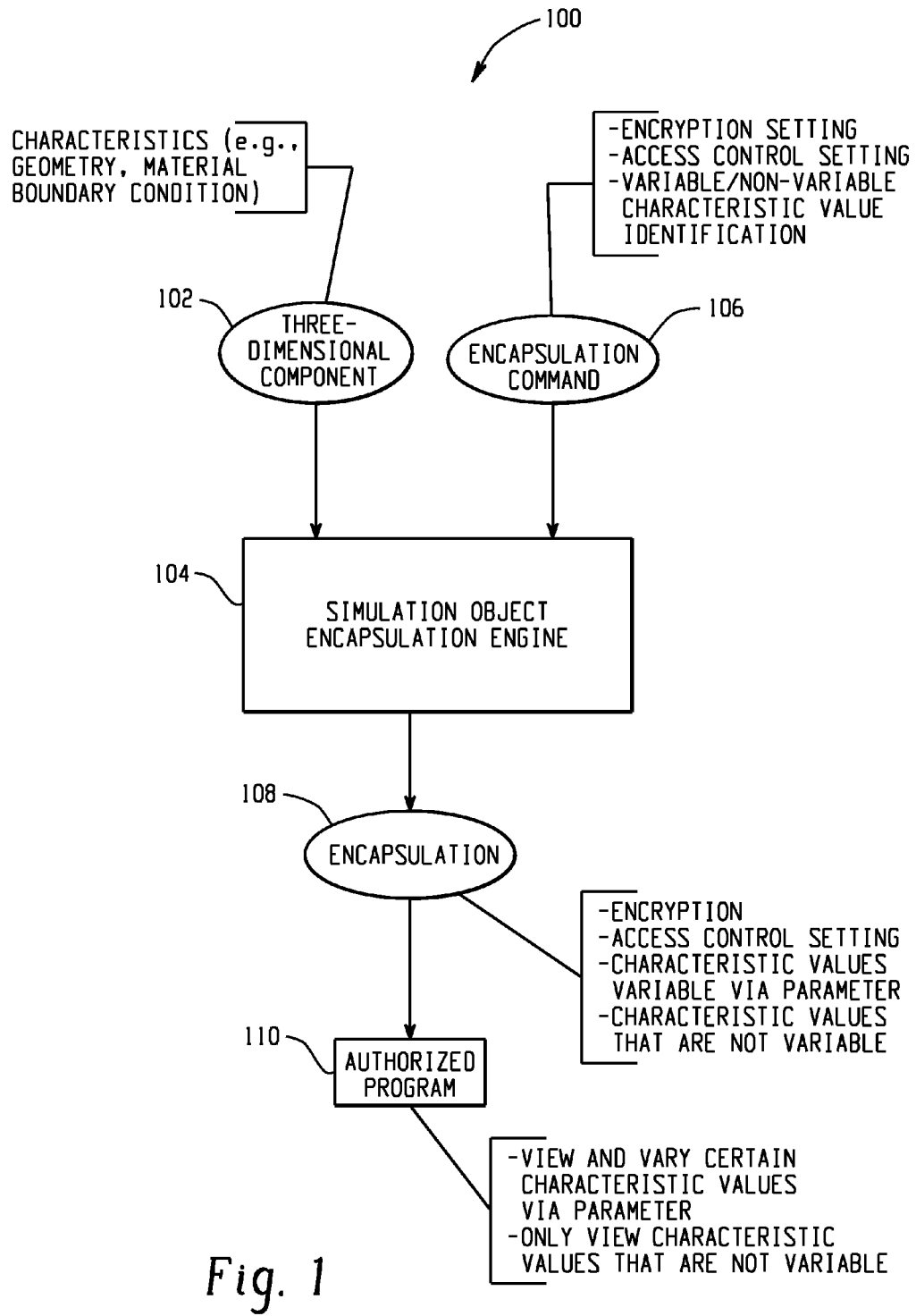
FIG. 1 is a block diagram of an example system for creating encapsulated three-dimensional components for simulation.

FIG. 1 is a block diagram of an example system 100 for creating encapsulated three-dimensional components for simulation. As shown, a three-dimensional (3D) component or sub-model 102 is input to a simulation object encapsulation engine 104 along with one or more encapsulation commands 106 in order to generate an encapsulated 3D component 108. The 3D component 102 defines the characteristics of a simulation-ready model of a component which may, for example, be used as part of an EM simulation of a system. The characteristics of the 3D component 102 are defined by the component creator and may, for example, include the component geometry, materials, boundary conditions, excitations, etc.

The encapsulation command(s) 106 provide instructions to the simulation object encapsulation engine 104 to define how the 3D component 102 is to be encapsulated. The encapsulation command(s) 106 may, for example, include encryption, access control and/or accessibility settings. For instance, the encapsulation command(s) 106 may be used to enable component encryption, to specify a password, and possibly to specify a security message that identifies conditions for component use. For stronger protection, the encapsulation command(s) 106 may specify contents of the component characteristics that should be hidden when the component is used. The encapsulation command(s) 106 may also be used to provide other information for the encapsulated component 108, such as owner information (e.g., name, email address, image, logo, etc.), component notes, or identifying information (e.g., component name, version number, etc.)

The simulation object encapsulation engine 104 may, for example, be part of a 3D electromagnetic simulation platform, such as ANSYS® HFSS™. The simulation object encapsulation engine 104 provides a security framework for the 3D component 102 based on the encapsulation command(s) 106 to create an encapsulation 108 of the 3D component. The 3D component encapsulation 108 generated by the simulation object encapsulation engine 104 may include encrypted data associated with the 3D component 102 and a component metadata data structure that may also be encrypted (see, e.g., FIGS. 4A and 4B.) Encryption of the 3D component 102 may, for example, be based on an encryption setting and an access control setting included in the encapsulation command(s) 106. The encryption setting may define the type and level of encryption applied by the simulation object encapsulation engine 104. The access control setting may be used to control access to the encrypted component encapsulation 108 such that the 3D component 102 is inaccessible outside of an authorized program 110.

The security framework applied by the simulation object encapsulation engine 104 based on the encapsulation command(s) 106 may also define variable and non-variable characteristic values of the 3D component 102. Certain characteristics also may be defined by the encapsulation command(s) 106 to be unviewable.

Access to the component characteristics may be further controlled by the access control settings. For example, the access control settings may include one or more passwords that provide different levels of access to the 3D component characteristics. For instance, a first password may be used to enable a third-party to view the characteristics, and a second password may be used to enable an owner or other third-party to adjust the characteristics within an authorized program 110.

The encapsulated component 108 provides a constant definition for the component, enabling reuse within or between different system assemblies. In order to fundamentally modify a component 102, the creator of the component definition may be required to edit the component characteristics outside of the system assembly and create a new version that replaces the original definition (e.g., "breaking" the component encapsulation to directly edit the component contents, including characteristics, and then "re-encapsulate" it). In other embodiments, however, a component instance may be provided within the system assembly that provides an editor for creating or modifying a component definition. For example, for an encrypted component, a first password may enable utilization of the 3D component, while a second password, associated with a higher level of access, enables modification of component contents.

The simulation object encapsulation engine 104 may be used to provide different levels of protection. For example, encapsulation command(s) 106 may be selected to provide a "lightweight" version of encrypted components that enables the component owner to control use of the component (possibly based on legal or business agreements) without hiding the contents of the model from trusted users. In another example, stronger protection may be provided by hiding details of the electromagnetic setup or the geometric parts within a given component.

Figure 2:
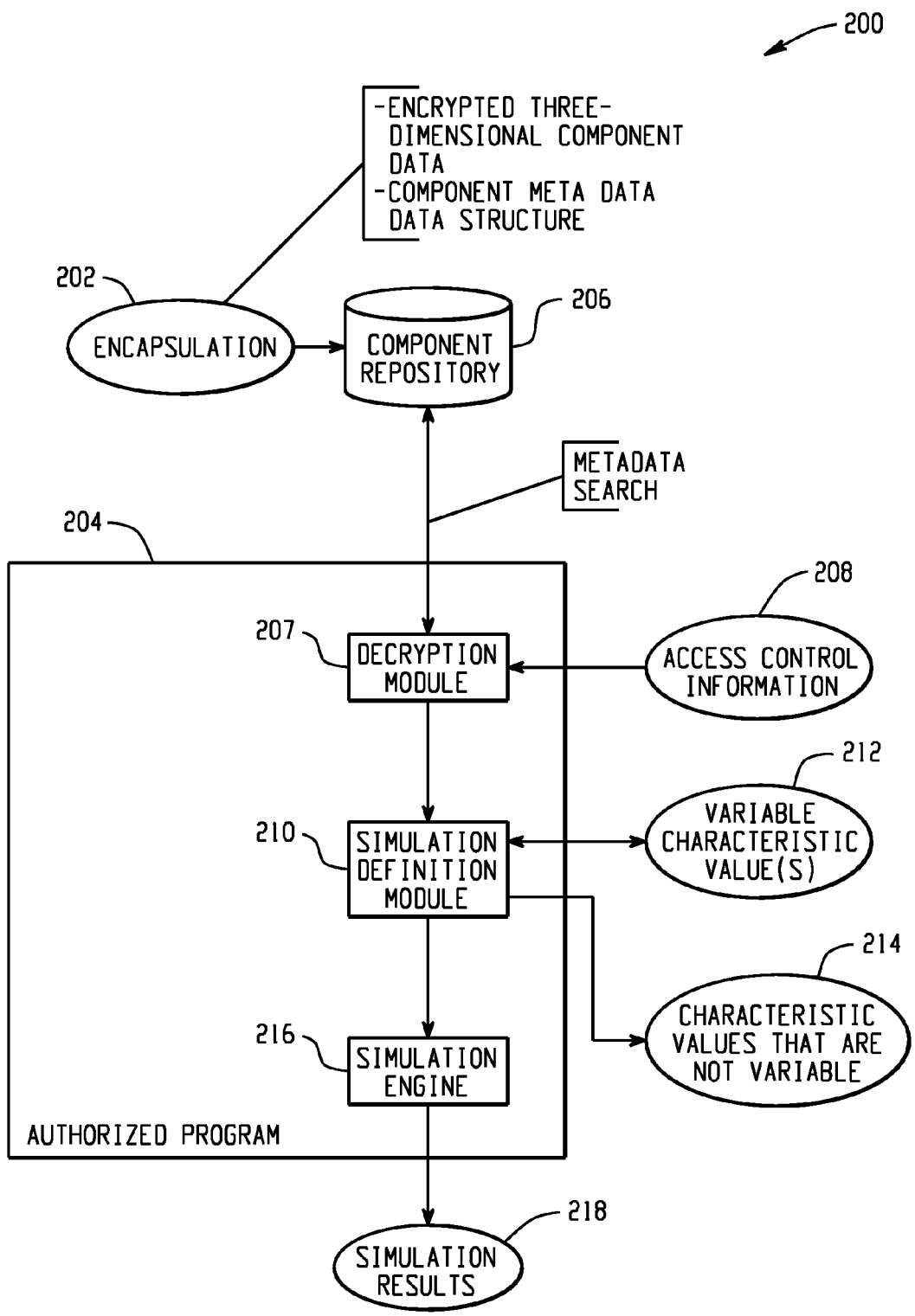
FIG. 2 is a block diagram of an example system for creating a simulation using encapsulated three-dimensional components.

FIG. 2 is a block diagram of an example system 200 for creating a simulation using encapsulated 3D components. Encapsulated 3D components 202, for example created using the system of FIG. 1, may be transmitted from the component creator to a third party (e.g., customer) for use in an authorized simulation program 204. Received encapsulated components 202 are stored in a component repository 206 accessible by the authorized program 204. The authorized simulation program 204 may, for example, be ANSYS® HFSS™ 3D electromagnetic simulation software or some other suitable simulation software package.

Each component encapsulation 202 stored in the component repository 206 may include encrypted 3D component data and a component metadata data structure. In one embodiment, the component metadata structure is encrypted using a different type or level of encryption than the encrypted 3D component data (e.g., the component metadata structure can be accessed without user-password entry in a trusted application). In another example, the component metadata structure is unencrypted. An example of the component data structure is illustrated in FIGS. 4A and 4B. As shown in FIG. 4A, the stored component data structure may include a component table 402 that identifies each component available in the component repository 206. The component table 402 may include component IDs to uniquely identify each stored component, along with other identifying information such as the component name, the component creator, the size of the component, and the terms for accessing the component. The terms for accessing a component may, for example, be displayed to the user by the authorized program 204 prior to incorporating the component into a simulation. As shown in FIG. 4B, the component data structure may also include a parameter table 404 that identifies and defines properties of the parameters for each stored component. As illustrated, the parameter table 404 may include a column 406 to associate each parameter with one of the components included in the component table 402. In addition, the parameter table 404 may include columns 408-414 to define the parameter name, the type of parameter, the parameter value, and whether the parameter is variable.

With reference again to FIG. 2, a user of the authorized program 204 may retrieve one or more encapsulated components from the component repository 206 for use in a simulation. Encapsulated components may, for example, be retrieved from the component repository 206 by entering one or more search terms to identify a component(s) based on information included in its stored metadata data structure. A user may also be able to browse through the available components in the component repository 206, for example using an interface that extracts and displays a component preview and available information about a selected component. Once an encapsulated component is retrieved from the component repository 206 for insertion into a simulation model, a decryption module 207 may be used to decrypt the component using access control information 208 (e.g., a password) entered by an authorized user.

The unencrypted component may then be incorporated into a simulation model using a simulation definition module 210. As shown, user input 212 may be received to modify any parameters of the component for use in the simulation. Characteristics 214 of the component may be displayed to the user, but may not be modified, unless values of those characteristics are variable via a parameter. After a component has been successfully decrypted and inserted into a simulation model, further use of the model, including opening, editing, solving and post-processing of the model may be performed without further entry of the access control information 208. In this manner, the system provides a balance between security and usability.

A simulation model may include a single standalone component with any additional contents necessary to support standalone simulation, or may include a combination of components assembled into a system. If used as part of a system model, the authorized program 204 may validate that the component setups are appropriate for the particular type of system model. Once all of the desired components have been retrieved and assembled to model the system under simulation, a simulation is executed by the simulation engine 216 to generate the simulation results 218. In other examples, the authorized program 204 may be used to assemble one or more components into a global simulation-ready model that may be executed by other simulation programs.

Figure 3:
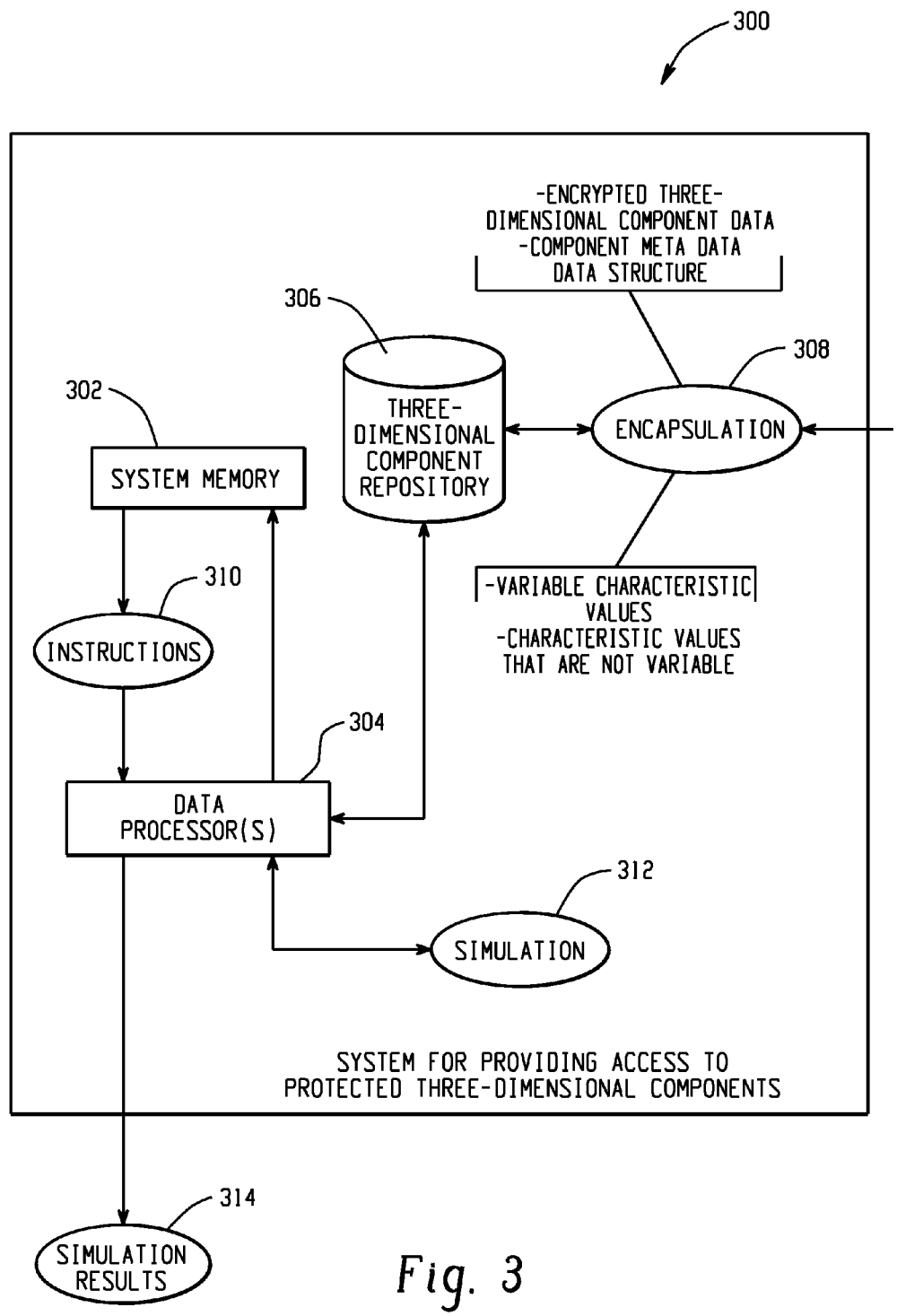
FIG. 3 is a block diagram of an example system for providing access to protected three-dimensional components.

FIG. 3 is a block diagram of an example system 300 for providing access to protected 3D components. The system 300 includes a system memory 302 and one or more data processors 304. The system 300 further includes a 3D component repository 306, which may be stored in the system memory 302 or some other computer-readable medium accessible by the data processor(s) 304. The 3D component repository 306 is configured to store simulation component encapsulations 308 received by the system 300 for use in simulations. Each 3D component encapsulation 308 includes encrypted data associated with a 3D component and a component metadata data structure. Each stored encapsulation further includes characteristics with values that may be varied via a parameter.

The system 300 further includes computer instructions 310 stored in the system memory 302 and executable by the data processor(s) 304 for commanding the one or more data processors to execute steps for performing a simulation 312 using one or more of the component encapsulations 308 stored in the component repository 306 to generate simulation results 314. For example, the computer instructions 310 may include the authorized program 204 described above with reference to FIG. 2.

Figure 5:
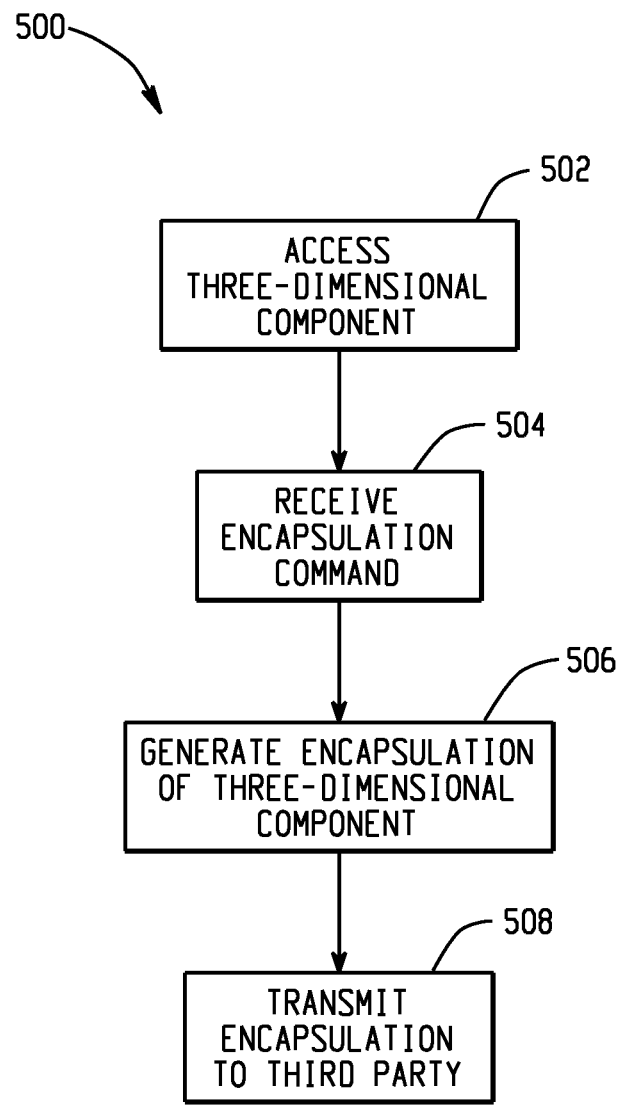
FIG. 5 is a flow diagram of an example method for creating encapsulated three-dimensional components for simulation.

FIG. 5 is a flow diagram of an example method 500 for creating encapsulated 3D components for simulation. In step 502, a 3D component is accessed having one or more characteristics. Values of certain characteristics of the 3D component may be varied via a parameter. Characteristics of the 3D component are provided for viewing on a graphical user interface, for example to provide an audit of operation the 3D component during simulation.

In step 504, an encapsulation command is received for the 3D component. The encapsulation command may include an encryption setting, an access control setting, and an identification of which values of the characteristics of the 3D component are variable via a parameter. The encryption setting in the encapsulation command may, for example, include one or more passwords. In one example, the encryption setting may include a first password for enabling use of the 3D component, and a second password for enabling fundamental modification of the component.

In step 506, an encapsulation of the 3D component is generated. The encapsulation is encrypted based on the encryption setting and the access control setting, such that, when the 3D component is encrypted, the 3D component is inaccessible outside of an authorized program. In other examples, the encapsulation may include multiple sets of encrypted data, with each set of encrypted data being associated with a single 3D component.

In step 508, the encapsulation is transmitted to a third party for access via the authorized program. When the encapsulation is accessed via the authorized program according to the access control setting, the 3D component is usable for simulation. In one example, characteristics of the 3D component are available for viewing, but not editing. Further, some values of the characteristics of the 3D component may be varied via a parameter.

This written description uses examples to disclose the invention and also to enable a person skilled in the art to make and use the invention. The patentable scope of the invention may include other examples that occur to those skilled in the art. For example, while the systems and methods described herein are described with respect to three-dimensional components, the systems and methods apply equally well to two-dimensional components.

It is noted that the systems and methods described herein may be implemented on various types of computer architectures. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.) It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method for providing protected three-dimensional components for simulation, comprising:
   by a computer:
   accessing a three-dimensional component, wherein the three-dimensional component includes one or more characteristics of the three-dimensional component, wherein certain values of characteristics of the three-dimensional components are variable via a parameter;
   receiving an encapsulation command for the three-dimensional component, wherein the encapsulation command includes an encryption setting, an access control setting, an identification of which values of the three-dimensional component are variable via a parameter, and an identification of which of the values are not variable via a parameter;

generating an encapsulation of the three-dimensional component, wherein the encapsulation is encrypted based on the encryption setting and the access control setting, wherein, when the three-dimensional component is encrypted, the three-dimensional component is inaccessible outside of an authorized program;

transmitting the encapsulation to a third party computer, wherein when the encapsulation is accessed via the authorized program according to the access control setting, the three-dimensional component is usable for simulation, wherein the variable values are available for adjustment by the third party for simulation via a parameter, and wherein the values that are not variable are available for viewing but not varying by the third party, wherein the characteristics are provided for viewing on a graphical user interface but not adjustment by the authorized program to provide an audit of operation of the three-dimensional component during simulation.

2. The method of claim 1, wherein the three-dimensional component is incorporated into a simulation of physical field quantities in a system.

3. The method of claim 1, wherein multiple instances of the three-dimensional component are incorporated into a simulation using the encapsulation.

4. The method of claim 1, wherein the encapsulation is used to import the three-dimensional component into multiple disparate simulations.

5. The method of claim 1, wherein the access control setting is a password.

6. The method of claim 1, wherein the access control setting includes a first password and a second password, wherein a user entering the first password is able to view the characteristics of the three-dimensional component, and wherein a user entering the second password is able to modify the characteristics of the three-dimensional component, creating a new version of the three-dimensional component.

7. The method of claim 1, wherein the access control setting includes a password that is assigned to a particular third party, wherein unauthorized dissemination of the three-dimensional component is detected using the password.

8. The method of claim 1, wherein the three-dimensional component is incorporated into multiple modules of the authorized program, wherein the characteristics of the three-dimensional component are protected from adjustment at each of the multiple modules.

9. The method of claim 1, wherein the encapsulation command further includes an identification of which of the characteristics of the three-dimensional component are unviewable.

10. The method of claim 1, wherein the encapsulation comprises:
encrypted data associated with the three-dimensional component; and
a component metadata data structure.

11. The method of claim 10, wherein the encapsulation comprises multiple sets of encrypted data, each set of encrypted data associated with a single three-dimensional component;
wherein the component metadata data structure includes records associated with each of multiple three-dimensional components contained within the encapsulation.

12. The method of claim 10, wherein the component metadata data structure is encrypted with a different level of encryption than the encrypted data associated with the three-dimensional component.

13. The method of claim 12, wherein the component metadata data structure does not require entry of a password for access by an authorized program, wherein the encrypted data associated with the three-dimensional component requires password entry for access by the authorized program.

14. The method of claim 12, wherein the component metadata data structure is unencrypted.

15. The method of claim 1, wherein component metadata data structure comprises:
a component name field;
a component creator field;
a component terms of access field.

16. The method of claim 15, wherein the authorized program is configured to display data from the component terms of access field prior to incorporation of the three-dimensional component into a simulation.

17. The method of claim 15, wherein the encapsulation is identifiable via a search by the authorized program based on the component metadata data structure.

18. The method of claim 1, wherein the encryption setting commands that the three-dimensional component not be encrypted.

19. The method of claim 1, wherein the parameters include a geometry parameter, a material parameter, and a boundary condition parameter.

20. A computer-implemented method for providing protected three-dimensional components for simulation, comprising:
by a computer:
accessing a three-dimensional component, wherein the three-dimensional component includes one or more characteristics of the three-dimensional component, wherein certain values of characteristics of the three-dimensional components are variable via a parameter;
receiving an encapsulation command for the three-dimensional component, wherein the encapsulation command includes an encryption setting, an access control setting, an identification of which values of the three-dimensional component are variable via a parameter, and an identification of which of the values are not variable via a parameter;
generating an encapsulation of the three-dimensional component, wherein the encapsulation is encrypted based on the encryption setting and the access control setting, wherein, when the three-dimensional component is encrypted, the three-dimensional component is inaccessible outside of an authorized program;
transmitting the encapsulation to a third party computer, wherein when the encapsulation is accessed via the authorized program according to the access control setting, the three-dimensional component is usable for simulation, wherein the variable values are available for adjustment by the third party for simulation via a parameter, and wherein the values that are not variable are available for viewing but not varying by the third party, wherein the three-dimensional component is incorporated into a simulation of physical field quantities in a system.

21. The method of claim 20, wherein the characteristics are provided for viewing on a graphical user interface but not adjustment by the authorized program to provide an audit of operation of the three-dimensional component during simulation.

22. The method of claim 20, wherein multiple instances of the three-dimensional component are incorporated into a simulation using the encapsulation.

23. The method of claim 20, wherein the encapsulation is used to import the three-dimensional component into multiple disparate simulations.

24. The method of claim 20, wherein the access control setting is a password.

25. The method of claim 20, wherein the access control setting includes a first password and a second password, wherein a user entering the first password is able to view the characteristics of the three-dimensional component, and wherein a user entering the second password is able to modify the characteristics of the three-dimensional component, creating a new version of the three-dimensional component.

26. The method of claim 20, wherein the access control setting includes a password that is assigned to a particular third party, wherein unauthorized dissemination of the three-dimensional component is detected using the password.

27. The method of claim 20, wherein the three-dimensional component is incorporated into multiple modules of the authorized program, wherein the characteristics of the three-dimensional component are protected from adjustment at each of the multiple modules.

28. The method of claim 20, wherein the encapsulation command further includes an identification of which of the characteristics of the three-dimensional component are unviewable.

29. The method of claim 20, wherein the encapsulation comprises:
   encrypted data associated with the three-dimensional component; and
   a component metadata data structure.

30. The method of claim 29, wherein the encapsulation comprises multiple sets of encrypted data, each set of encrypted data associated with a single three-dimensional component;
   wherein the component metadata data structure includes records associated with each of multiple three-dimensional components contained within the encapsulation.

31. The method of claim 29, wherein the component metadata data structure is encrypted with a different level of encryption than the encrypted data associated with the three-dimensional component.

32. The method of claim 31, wherein the component metadata data structure does not require entry of a password for access by an authorized program, wherein the encrypted data associated with the three-dimensional component requires password entry for access by the authorized program.

33. The method of claim 31, wherein the component metadata data structure is unencrypted.

34. The method of claim 20, wherein component metadata data structure comprises:
   a component name field;
   a component creator field;
   a component terms of access field.

35. The method of claim 34, wherein the authorized program is configured to display data from the component terms of access field prior to incorporation of the three-dimensional component into a simulation.

36. The method of claim 34, wherein the encapsulation is identifiable via a search by the authorized program based on the component metadata data structure.

37. The method of claim 20, wherein the encryption setting commands that the three-dimensional component not be encrypted.

38. The method of claim 20, wherein the parameters include a geometry parameter, a material parameter, and a boundary condition parameter.

39. A computer-implemented system for providing protected three-dimensional components for simulation, comprising:
   a computer comprising one or more data processors and a non-transitory computer-readable medium encoded with instructions for configuring the one or more data processors to:
   access a three-dimensional component, wherein the three-dimensional component includes one or more characteristics of the three-dimensional component, wherein certain values of characteristics of the three-dimensional components are variable via a parameter;
   receive an encapsulation command for the three-dimensional component, wherein the encapsulation command includes an encryption setting, an access control setting, an identification of which values of the three-dimensional component are variable via a parameter, and an identification of which of the values are not variable via a parameter;
   generate an encapsulation of the three-dimensional component, wherein the encapsulation is encrypted based on the encryption setting and the access control setting, wherein, when the three-dimensional component is encrypted, the three-dimensional component is inaccessible outside of an authorized program;
   transmit the encapsulation to a third party computer, wherein when the encapsulation is accessed via the authorized program according to the access control setting, the three-dimensional component is usable for simulation, wherein the variable values are available for adjustment by the third party for simulation via a parameter, and wherein the values that are not variable are available for viewing but not varying by the third party, wherein the three-dimensional component is incorporated into a simulation of physical field quantities in a system.

40. A non-transitory computer-readable medium encoded with instructions for commanding one or more data processors to execute steps of a method for providing protected three-dimensional components for simulation, the method comprising:
   accessing a three-dimensional component, wherein the three-dimensional component includes one or more characteristics of the three-dimensional component, wherein certain values of characteristics of the three-dimensional components are variable via a parameter;
   receiving an encapsulation command for the three-dimensional component, wherein the encapsulation command includes an encryption setting, an access control setting, an identification of which values of the three-dimensional component are variable via a parameter, and an identification of which of the values are not variable via a parameter;
   generating an encapsulation of the three-dimensional component, wherein the encapsulation is encrypted based on the encryption setting and the access control setting, wherein, when the three-dimensional component is encrypted, the three-dimensional component is inaccessible outside of an authorized program;
   transmitting the encapsulation to a third party computer, wherein when the encapsulation is accessed via the authorized program according to the access control setting, the three-dimensional component is usable for simulation, wherein the variable values are available for adjustment by the third party for simulation via a parameter, and wherein the values that are not variable are available for viewing but not varying by the third party, wherein the three-dimensional component is incorporated into a simulation of physical field quantities in a system.

* * * * *